US008649244B2

(12) United States Patent
Tsurugaya et al.

(10) Patent No.: US 8,649,244 B2
(45) Date of Patent: Feb. 11, 2014

(54) TARGET SEARCHING DEVICE, TARGET SEARCHING PROGRAM, AND TARGET SEARCHING METHOD

(75) Inventors: Yoshiaki Tsurugaya, Tokyo (JP);
Toshiaki Kikuchi, Kanagawa (JP)

(73) Assignees: NEC Corporation, Tokyo (JP);
Toshiaki Kikuchi, Kanagawa (JP)

( * ) Notice: Subject to any disclaimer, the term of this patent is extended or adjusted under 35 U.S.C. 154(b) by 201 days.

(21) Appl. No.: 12/491,678

(22) Filed: Jun. 25, 2009

(65) Prior Publication Data
US 2009/0323473 A1    Dec. 31, 2009

(30) Foreign Application Priority Data

Jun. 27, 2008    (JP) ................................ 2008-169630

(51) Int. Cl.
*G01S 3/80*    (2006.01)
*G01S 1/72*    (2006.01)
(52) U.S. Cl.
CPC ........................................ *G01S 1/72* (2013.01)
USPC .......................................................... 367/126
(58) Field of Classification Search
USPC .......................................................... 367/126
See application file for complete search history.

(56) References Cited

U.S. PATENT DOCUMENTS

| 5,305,286 | A * | 4/1994 | Woodsum et al. | 367/92 |
| 5,359,575 | A * | 10/1994 | Williams et al. | 367/127 |
| 5,704,355 | A * | 1/1998 | Bridges | 600/407 |
| 5,829,437 | A * | 11/1998 | Bridges | 600/430 |
| 2004/0174770 | A1* | 9/2004 | Rees | 367/7 |
| 2005/0270906 | A1* | 12/2005 | Ramenzoni | 367/99 |
| 2006/0109743 | A1* | 5/2006 | Kosalos et al. | 367/88 |
| 2006/0133211 | A1* | 6/2006 | Yang | 367/154 |
| 2006/0164270 | A1* | 7/2006 | Miller et al. | 341/143 |
| 2006/0227042 | A1* | 10/2006 | Budic | 342/195 |
| 2007/0040729 | A1* | 2/2007 | Ohnishi | 342/93 |
| 2007/0071077 | A1* | 3/2007 | Yang | 375/218 |
| 2007/0140499 | A1* | 6/2007 | Davis | 381/23 |
| 2007/0159922 | A1* | 7/2007 | Zimmerman et al. | 367/103 |
| 2007/0274152 | A1* | 11/2007 | Rees | 367/7 |
| 2008/0018521 | A1* | 1/2008 | Sahinoglu et al. | 342/27 |
| 2008/0031463 | A1* | 2/2008 | Davis | 381/17 |

OTHER PUBLICATIONS

S. Kim, et al., "Robust time reversal focusing in the ocean", J. Acoust. Soc. Am. 114 (1), Jul. 2003, p. 145-157.

(Continued)

*Primary Examiner* — Luke Ratcliffe
*Assistant Examiner* — James Hulka
(74) *Attorney, Agent, or Firm* — Sughrue Mion, PLLC

(57) ABSTRACT

The target searching device includes: a sound source which transmits a sound wave into a propagation space; a transducer array placed in an area to receive a forward scattering wave which scatters forward from the target within the propagation space; a subtraction processing device which subtracts a traveling wave directly traveling towards the transducer array from a mixed wave of the forward scattering wave and the traveling wave so as to separate the forward scattering wave; a passive-phase conjugate processing device which performs passive-phase conjugate processing on the forward scattering wave separated by the subtraction processing device so as to generate a passive-phase conjugated signal of the forward scattering wave; an autocorrelation processing device which performs autocorrelation processing on the traveling wave to generate an autocorrelation processed signal of the traveling wave; and a correlation device which judges a similarity between the autocorrelation processed signal and the passive-phase conjugated signal.

13 Claims, 12 Drawing Sheets

(56) References Cited

OTHER PUBLICATIONS

S. C. Walker, et al., "Focal depth shifting of a time reversal mirror in a rang-independent waveguide", J. Acoust. Soc. Am. 118 (3), Sep. 2005, p. 1341-1347.

S. C. Walker, et al., "Active waveguide Green's function estimation with application to time-reversal focusing without a probe source in a range-independent waveguide". J. Acoust. Soc. Am. 120 (5), Nov. 2006, p. 2755-2763.

G. Montaldo, et al., "Revisiting iterative time reversal processing: Application to detection of multiple targets", J. Acoust. Soc. Am. 115 (2), Feb. 2004, p. 776-784.

C. Prada et al., "Decomposition of the time reversal operator: Detection and selective focusing on two scatterers", J. Acoust. Soc Am. 99 (4), Apr. 1996. p. 2067-2076.

N. Mordant, et al., "Highly resolved detection and selective focusing in a waveguide using the D.O.R.T. method", J. Acoust. Soc. Am. 105 (5), May 1999. p. 2634-2642.

D. H. Chambers, "Analysis of the time-reversal operator scatterers of finite size", J. Acoust. Soc. Am. 112 (2), Aug. 2002, p. 411-419.

D. H. Chambers, et al., "Time reversal for a single spherical scatterer", J. Acoust. Soc. Am. 109 (6), Jun. 2001, p. 2616-2624.

D. R. Jackson et al., "Phase conjugation in underwater acoustics", J. Acoust. Soc. Am. (1) Jan. 1991 p. 171-181.

W. A. Kuperman, et al., "Phase conjugation in the ocean; Experimental demonstration of an acoustic time-reversal mirror", J. Acoust. Soc. Am. 103 (1), Jan. 1998, p. 25-40.

D. Rouseff et al., "Underwater Acoustic Communication by Passive-Phase Conjugation; Theory and Experimental Results", IEEE Journal of Oceanic Engineering, vol. 26, No. 4, Oct. 2001, p. 821-831.

R. B. Evans, "A coupled mode solution for acoustic propagation in a wave guide with stepwise depth variations of a penetrable bottom", J. Acoust. Soc. Am. 74, Jul. 1983, p. 188-195.

European Search Report for EP 09 25 1655 completed Oct. 16, 2009.

A. L. Matveev et al., "Forward Scattering Observation With Partially Coherent Spatial Processing of Vertical Array Signals in Shallow Water", IEEE Journal of Oceanic Engineering, vol. 32, No. 3, Jul. 2007, pp. 626-639.

Y. Tsurugaya. et al., "Sound beam scanning in sediment layer using phase conjugated pseudo sound source", XP007910175, Acoustic Science and Technology 2008 Acoustic Society of Japan JP, vol. 29, No. 1, 2008, pp. 9-14.

\* cited by examiner

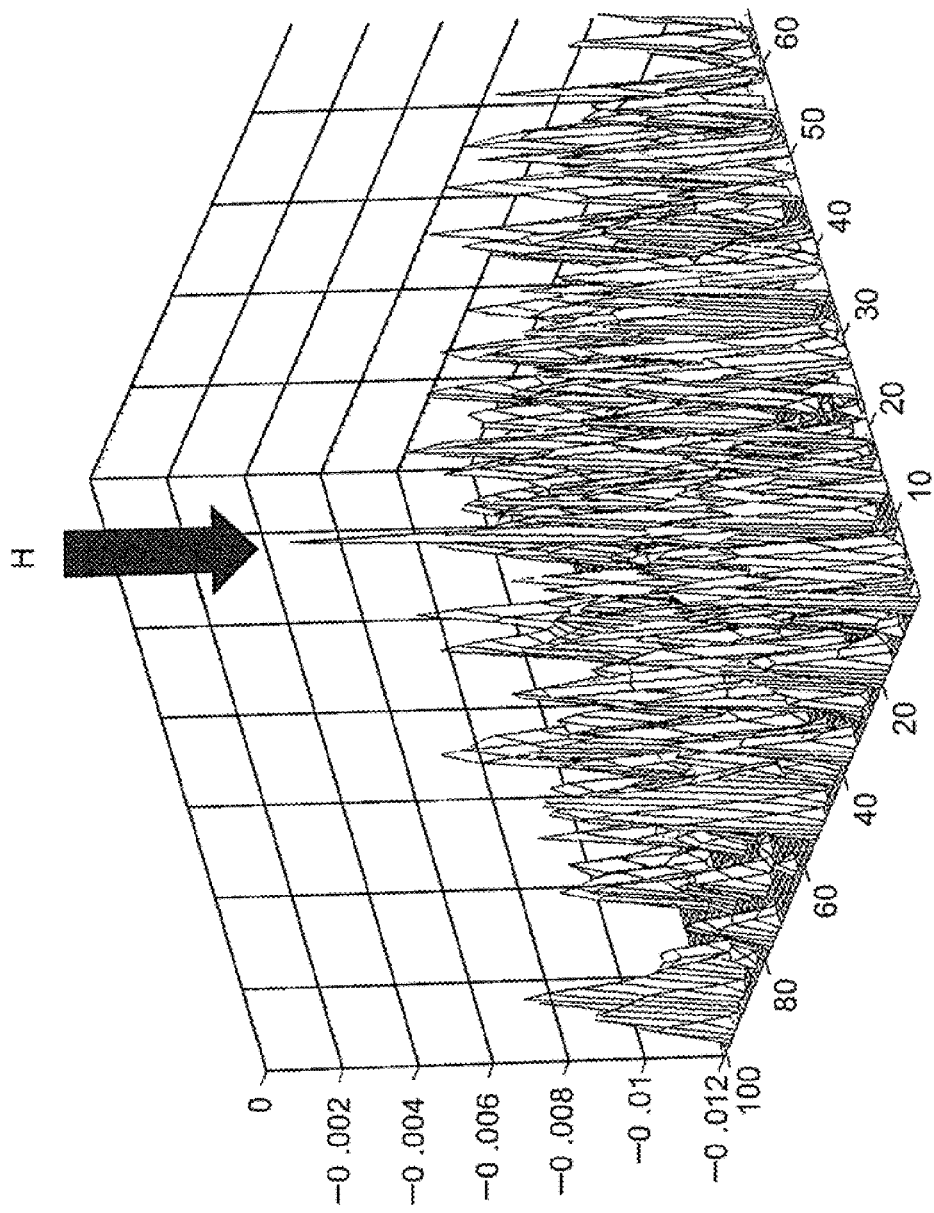

TARGET SEARCHING DEVICE, TARGET SEARCHING PROGRAM, AND TARGET SEARCHING METHOD

CROSS-REFERENCE TO RELATED APPLICATION

This application is based upon and claims the benefit of priority from Japanese patent application No. 2008-169630, filed on Jun. 27, 2008, the disclosure of which is incorporated herein in its entirety by reference.

BACKGROUND OF THE INVENTION

1. Field of the Invention

The present invention relates to a target searching device, a target searching program, and a target searching method for searching a target by using passive-phase conjugate processing.

2. Description of the Related Art

In the field of underwater acoustics, there have been more researches conducted on signal time-reversals (Non-Patent Document 1: S. Kim, W. A. Kuperman, W. S. Hodgkiss, H. C. Song, G. F. Edelmann, and T. Akal, "Robust time reversal focusing in the ocean," J. Acoust. Soc. Am. 114, 145-157 (2003); Non-Patent Document 2: S. C. Walker, P. Roux, and W. A. Kuperman, "Focal depth shifting of a time reversal mirror in a rang-independent waveguide," J. Acoust. Soc. Am. 118, 1341-1347(2005); and Non-Patent Document 3: S. C. Walker, W. A. Kuperman, and P. roux, "Active waveguide Green's function estimation with application to time-reversal focusing without a probe source in a rang-indepent waveguide," J. Acoust. Soc. Am. 120, 2755-2763(2006)). When searching a target in shallow water, sound waves transmitted into the water are reflected at the sea surface or the seabed, thereby generating reflected waves. This makes it difficult to search the target in some cases.

Recently, a searching method which applies phase conjugate processing on reflected waves from a target has drawn attentions (Non-Patent Document 4: G. Mcntaldo, M. Tanter, and M. Fink, "Revisiting iterative time reversal processing: Application to detection of multiple targets" J. Acoust. Soc. Am. 115, 776-784(2004); Non-Patent Document 5: C. Prada, S. Manneville, D. Spoliansky, and M. Fink, "Decomposition of the time reversal operator: Detection and selective focusing on two scatterers," J. Acoust. Soc. Am. 99, 2067-2076(1996); Non-Patent Document 6: N. Mordant, C. Prada, and M. Fink, "Highly resolved detection and selective focusing in a waveguide using the D. O. R. T. method," J. Acoust. Soc. Am. 105, 2634-2642(1999); Non-Patent Document 7: D. H. chambers, "Analysis of the time-reversal operator for scatterers of finite size," J. Acoust. Soc. Am. 112, 411-419(2002); and Non-Patent Document 8: D. H. chambers, A. K. Gautesen, "Time reversal for a single spherical scatterer," J. Acoust. Soc. Am. 109, 2616-2624(2001)). These searching methods use backward scattering waves which scatter backward from the target. Now, there is considered a case where a sound wave makes incident on a target. When the sound wave makes incident on the target, a part of the sound wave is scattered at the target and reversed towards a sound source side as a scattered wave. Such scattered waves are called backward scattering waves. Meanwhile, a part of the sound wave is scattered forward from the target. Such scattered waves are called forward scattering waves.

The searching methods disclosed in Non-Patent Documents 4-8 use the backward scattering waves which scatter backward from the target. However, in cases where the target is small or the sound waves are of low frequency, sufficient backward scattering waves may not be obtained at the time of receiving the backward scattering waves. Therefore, there is a possibility of becoming incapable of searching the target accurately with the searching method which uses the backward scattering waves.

Further, in the case with a small target, the level of the forward scattering waves is normally higher than the level of the backward scattering waves. When receiving the forward scattering waves, there are also traveling waves other than the forward scattering waves, which travel towards the wave-receiving side from the sound source existing in an area distant from the target. The forward scattering waves are generated when the sound waves from the sound source make incident on the target and scatter therefrom. Therefore, the forward scattering waves may be hidden in the traveling waves which directly travel from the sound source, so that the target may not be searched accurately by using the forward scattering waves in some cases.

SUMMARY OF THE INVENTION

An exemplary object of the present invention is to provide a target searching device, a target searching program, and a target searching method, which can accurately search a target by using forward scattering waves mixed in traveling waves which directly travel from a sound source.

In order to achieve the foregoing exemplary object, the target searching device according to an exemplary aspect of the invention is a device for searching a target existing within a propagation space, which searches the target by using a traveling wave from a sound source making incident on the target within the propagation space and a forward scattering wave scattering forward from the target. The device includes: a sound source which transmits a sound wave into the propagation space; a transducer array placed in an area to receive the forward scattering wave which scatters forward from the target existing within the propagation space; a subtraction processing device which subtracts the traveling wave directly traveling towards the transducer array from a mixed wave of the forward scattering wave and the traveling wave directly traveling towards the transducer array so as to separate the forward scattering wave; a passive-phase conjugate processing device which performs passive-phase conjugate processing on the forward scattering wave separated by the subtraction processing device so as to generate a passive-phase conjugated signal of the forward scattering wave; an autocorrelation processing device which performs autocorrelation processing on the traveling wave which makes incident on an arbitrary position within the propagation space by having the sound source as a reference position so as to generate an autocorrelation processed signal of the traveling wave; and a correlation device which judges a similarity between the autocorrelation processed signal and the conjugative correlation signal.

In the above case, the present invention is built as the target searching device as hardware. However, the present invention is not limited only to such case. The present invention may be built as a method for searching a target or may be built as a program as software for enabling a computer to execute the functions of the target searching device.

The target searching program according to another exemplary aspect of the invention is a program for executing a control for searching a target existing within a propagation space, which controls searching of the target by using a traveling wave from a sound source making incident on the target within the propagation space and a forward scattering wave scattering forward from the target. The program enables a computer to execute: a function which subtracts the traveling wave directly traveling towards the transducer array from a mixed wave of the forward scattering wave and the traveling wave directly traveling towards the transducer array so as to separate the forward scattering wave; a function which performs passive-phase conjugate processing on the forward scattering wave separated by the subtraction processing device so as to generate a passive-phase conjugated signal of the forward scattering wave; a function which performs autocorrelation processing on the traveling wave which makes incident on an arbitrary position within the propagation space by having the sound source as a reference position so as to generate an autocorrelation processed signal of the traveling wave; and a function which judges a similarity between the autocorrelation processed signal and the passive-phase conjugated signal.

The target searching method according to still another exemplary aspect of the invention is a method for searching a target existing within a propagation space, which searches the target by using a traveling wave from a sound source making incident on the target within the propagation space and a forward scattering wave scattering forward from the target. The method includes: transmitting a sound wave into the propagation space; subtracting the traveling wave directly traveling towards the transducer array from a mixed wave of the forward scattering wave and the traveling wave directly traveling towards the transducer array so as to separate the forward scattering wave; performing passive-phase conjugate processing on the forward scattering wave separated by the subtraction processing device so as to generate a passive-phase conjugated signal of the forward scattering wave; performing autocorrelation processing on the traveling wave which makes incident on an arbitrary position within the propagation space by having the sound source as a reference position so as to generate an autocorrelation processed signal of the traveling wave; and judging a similarity between the autocorrelation processed signal and the passive-phase conjugated signal.

BRIEF DESCRIPTION OF THE DRAWINGS

FIG. 12 is a schematic diagram of the target position by employing a matched field method.

DETAILED DESCRIPTION OF THE EXEMPLARY EMBODIMENTS

Exemplary embodiments of the invention will be described hereinafter by referring to the accompanying drawings.

Figure 2:
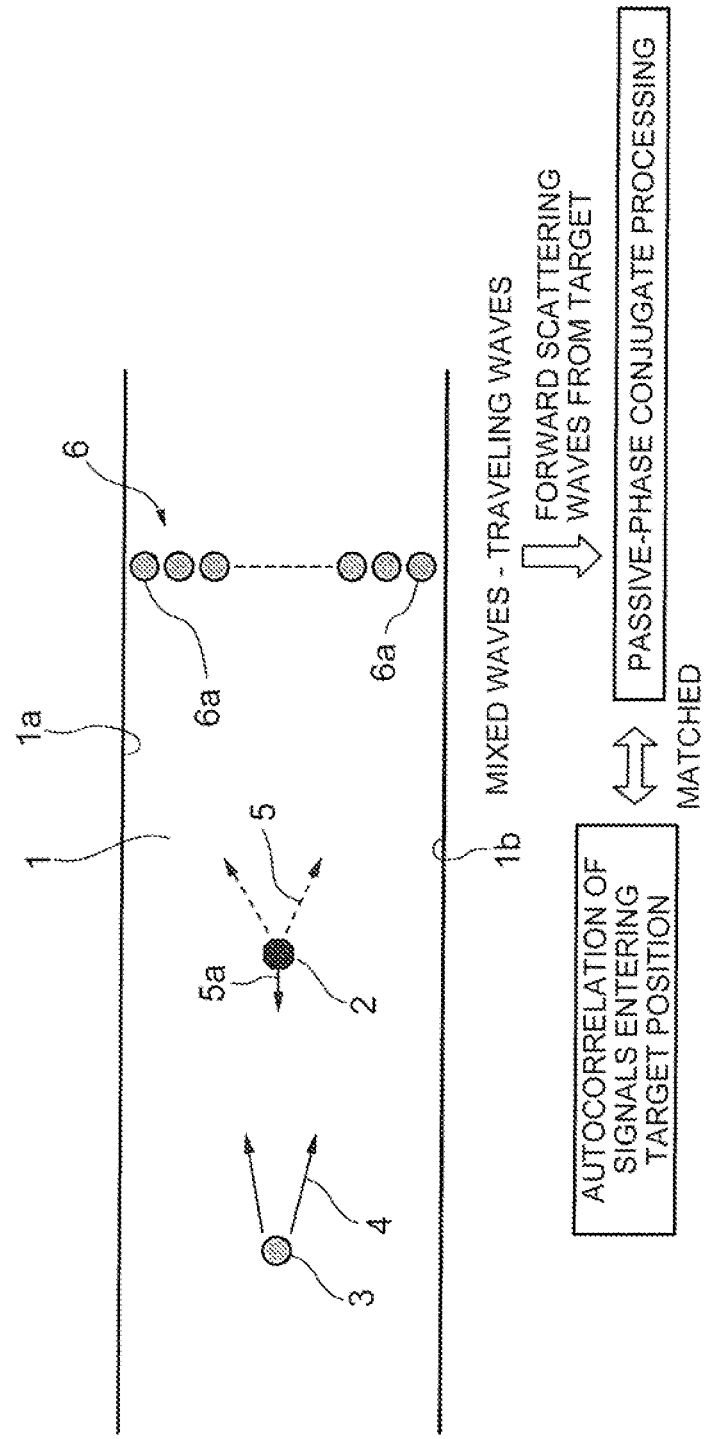
FIG. 2 is an illustration showing target searching processing of the exemplary embodiment of the invention.

A target searching device according to the exemplary embodiment of the invention is a device which searches a target existing within a propagation space 1. As shown in FIG. 2, the target searching device searches a target 2 by using traveling waves 4 from a sound source 3 making incident on a target 2 that is within the propagation space 1 and forward scattering waves 5 scattering forward from the target 2. Assuming that the underwater is considered as the propagation space 1, for example, reference numeral "1a" in FIG. 2 is the sea surface, "1b" is the seabed, and "1" is the water column as the propagation space 1. The sound source 3 is placed at a fixed position in the seawater 1 or placed by being hung from a searching ship. However, there is no specific limit set regarding the installation of the sound source 3. In FIG. 2, a scattering wave generated backward traveling towards the sound source 3 when the sound waves from the sound source 3 make incident on the target 2 is a backward scattering wave 5a, and scattering waves generated forward towards a transducer array 6 are the forward scattering waves 5.

The exemplary embodiment of the invention is characterized to prove that "autocorrelation function" of the sound wave making incident on the position of the target 2 and a waveform obtained by applying passive-phase conjugate processing on the forward scattering waves 5 scattered forward from the target 2 received at the transducer array 6 are similar, and to search the target based on a proved result.

It is verified that the "autocorrelation function" of the sound wave making incident on the position of the target 2 and the waveform obtained by applying passive-phase conjugate processing on the forward scattering waves 5 scattered forward from the target 2 received at the transducer array 6 are similar.

First, the phase conjugation will be investigated. As shown in FIG. 2, the sound source 3 and the transducer 6 are placed by being opposed to each other in shallow water, for example. The sound waves (traveling waves) transmitted from the sound source 3 are received at the transducer array 6 placed at a distant point. When time-reversal processing is applied on a received-wave signal received at the transducer array 6 and the obtained signal is transmitted again from the transducer array 6, the sound wave at the received point can be expressed by a following expression.

[Expression 1]

$$G_{\omega}(\vec{r}, \vec{r}_s) = \sum_{n=1}^{N} G_{\omega}^*(\vec{r}_n, \vec{r}_s) G_{\omega}(\vec{r}, \vec{r}_n) \quad (1)$$

Equation (1) is established in a literature by D. R Jackson and D. R. Dowling, "Phase conjugation in underwater acoustics" J. Acoust. Soc. Am. 89, 171-181 (1991).

[Expression 2]

$$G_{\omega}(\vec{r}_n, \vec{r}_s)$$

[Expression 3]

$$G_{\omega}(\vec{r}, \vec{r}_n)$$

In the equation (1), "Expression 2" is a Green's function regarding propagation from the sound source 3 to each element 6a of the transducer array 6. "Expression 3" is a Green's function regarding propagation from each element 6a of the transducer array 6 to the wave-receiving point. Note that "r" indicates a distance, and "s", "n", and "*" indicate the sound source, the number of each element of the transducer array, and a complex conjugate, respectively.

The equation (1) is of a frequency domain, whereas a following equation shows a case of a time domain.

[Expression 4]

$$P_{pc}(r, z', t) = \sum_{j=1}^{J} \int G_{\omega}(r, z, z_j) G_{\omega}^*(R; z_j, z_{ps}) \times e^{i\omega T} S^*(\omega)^{-i\omega} d\omega \quad (2)$$

Equation (2) is established in a literature by W. A. Kuperman, W. S. Hodgkiss, H. C. Song, T. Akal, C. Ferla and D. R. Jackson, "Phase conjugation in the ocean; Experimental demonstration of an acoustic time-reversal mirror", J. Acoust. Soc. Am. 103, 25-40 (1998).

In the equation (2), "Gω", "t", and "z" indicate a Green's function, time, and depth, respectively. "R" indicates a horizontal distance from the sound source 3 to the transducer array 6, and "r" indicates a distance between the transducer array 6 and the wave-receiving point. "S(ω)" is a frequency spectrum of a sound wave transmitted from the sound source 3, and "ω" is an angular frequency. The equation (2) is often used when checking a convergence characteristic of time-reversal waves.

The inventors of the present invention think that the equations (1) and (2) can be applied also to a sound field of the wave-receiving point other than the position of the sound source 3. This will be investigated. That is, the phase conjugated sound field at an arbitrary point other than the point of the sound source 3 will be investigated. It is assumed here that the arbitrary point is located between the sound source 3 and the transducer array 6 as in FIG. 2.

It is considered that the arbitrary point is a new sound source position. Driving signals of the new sound source are supplied from the original source 3. Therefore, the relation between the frequency spectrum S (ω) of the original sound source 3 and the frequency spectrum $S_R$ (ω) of the new sound source can be expressed as follows.

[Expression 5]

$$S_R(\omega) = S(\omega) G_{\omega}(r_R; z_R, z_{ps}) \quad (3)$$

In equation (3), subscript "R" indicates the arbitrary point.

Next, the phase conjugation of the arbitrary point other than the sound source 3 will be investigated by using equations (2) and (3). In a case of the typical phase conjugate, a sound wave pulse transmitted from the sound source 3 is received at the transducer array 6 for the processing shown in FIG. 2, and time-reversal processing is executed by each element 6a. Thereafter, the time-reversed signals (time-reversal signals) are transmitted from each element 6a again. Thus, the same sound wave pulse as the sound pulse transmitted from the sound source 3 is formed at the position of the sound source 3.

It is investigated whether or not the similar property as that of the above-described typical phase-conjugate wave is maintained at the arbitrary point with the exemplary embodiment of the invention. That is, the similarity between the sound wave (referred to as a direct wave hereinafter) which directly travels from the sound source 3 and the time-reversal signal will be investigated at the arbitrary point between the sound source 3 and the transducer array 6.

Simulation results will be studied. First, the direct wave and the time-reversal wave at the arbitrary point will be compared.

In the processing shown in FIG. 2, the depth to the seabed 1b is set to 100 m, and the distance between the sound source 3 and the transducer array 6 is set to 2.5 km. The underwater sound speed is 1500 m/s, and the underwater density is 1000 kg/m$^3$. Further, the sound speed in the sediment on the seabed 1b is 1600 m/s, and the density of the sediment is 1500 kg/m$^3$.

Figure 5A:
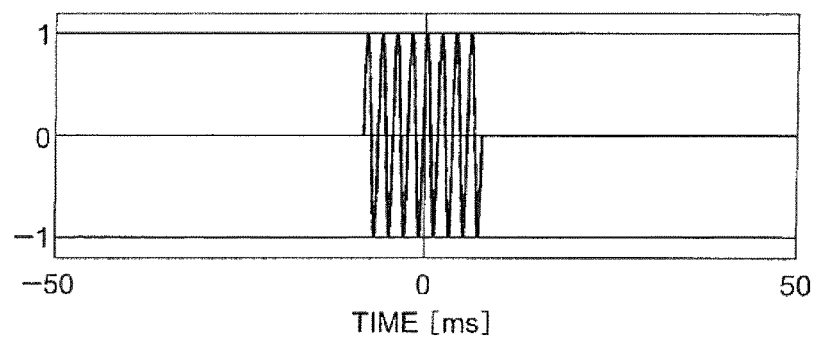
FIG. 5 shows charts of a tone-burst wave transmitted from a sound source.
Figure 5B:
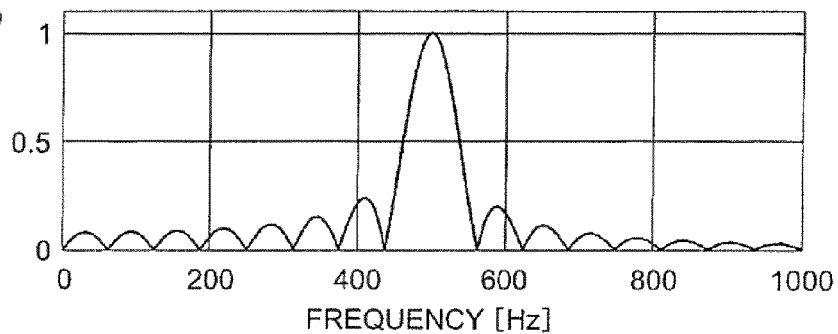

Tone-burst waves of a center frequency of 500 Hz and pulse width of 8 cycles are transmitted from the sound source 3 that is placed at the depth of 50 m. FIG. 5A shows the waveform of the tone-burst wave, and FIG. 5B shows the spectrum thereof.

Wideband pulses are used for the simulation conducted for checking the waveform of the sound wave pulses in a detailed manner. Such sound wave pulses are received at the transducer array 6, and time-reversal processing is applied by each of the elements 6a. Then, the time-reversal processed signals are transmitted again from each of the elements 6a. The retransmitted sound waves are received at the arbitrary point between the sound source 3 and the transducer array 6 (FIG. 2).

Then, the similarity between the time-reversal signals and the driving signals (the sound wave pulses supplied from the sound source 3) formed at the wave-receiving point will be investigated. At the point that is 1 km from the sound source 3, the sound waves directly making incident on the arbitrary point from the sound source 3 and the time-reversal signals are compared. In that case, the sound wave pulses propagated from the original sound source 3 are tone-burst waves. The spectrum shown in FIG. 5B corresponds to S(ω) of the equation (2).

The band width of the frequency spectrum used for computation is 350 Hz. The reason for this is that it is possible to show the waveform at the arbitrary point in detail by having the band width of the frequency spectrum set to 350 Hz. This band width corresponds to the band width to the third lobe of the frequency spectrum shown in FIG. 5B. In the meantime, the frequency spectrum of the new sound source can be obtained easily by a Fourier transformation of the sound wave pulse which directly makes incident on the arbitrary position from the original sound source 3.

Figure 6A:
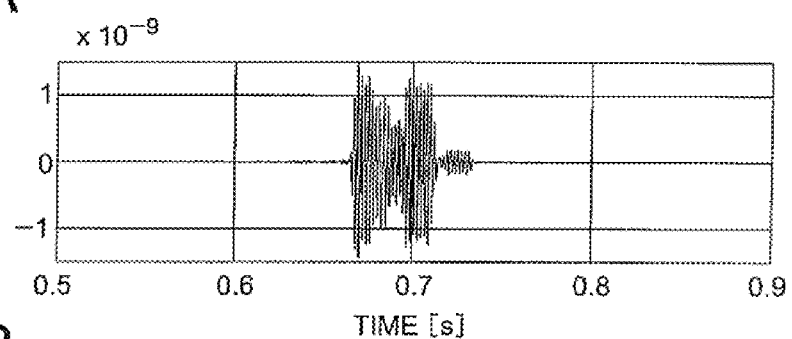
FIG. 6A is a chart showing a waveform of a sound pulse which makes incident on a new sound source from an original sound source.

The frequency spectrum $S_R(\omega)$ of the new sound and the frequency spectrum S(ω) of the original sound 3 can be related by the equation (3). The new sound source is located at the point that is 1 km distant from the original sound source 3 and at the depth of 50 m. FIG. 6A shows the waveform of the sound wave pulse which makes incident on the position of the new sound source from the original sound source 3, and FIG. 6B shows the waveform of the time-reversal signal.

Figure 6B:
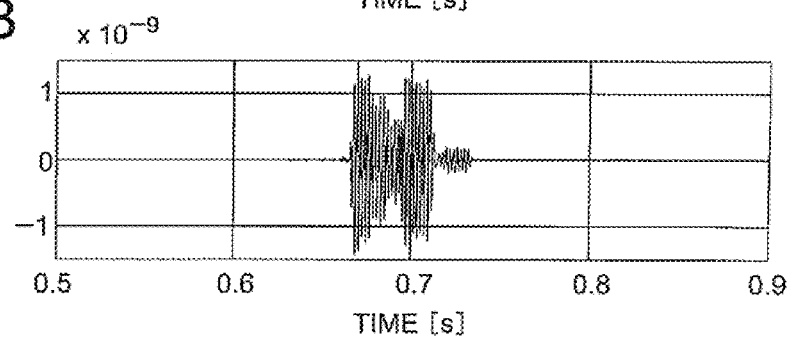
FIG. 6B is a chart showing a waveform of a time-reversal signal.

The traveling direction of the time-reversal signal shown in FIG. 6B is opposite from the traveling direction of the direct wave shown in FIG. 6A, so that the time-reversal signal is shown in coordinates where time is inverted. Further, the frequency spectrum S(ω) shown with the equation (2) can be directly obtained by a Fourier transformation of the sound wave pulse transmitted from the original sound source 3, considering that the sound wave making incident on the wave-receiving point is the new sound source. Comparing FIG. 6A and FIG. 6B, the waveform of the sound wave directly making incident from the original sound source 3 matches the waveform of the time-reversal signals.

From the investigated results described above, it can be seen that the phase-conjugate property is maintained at the arbitrary point between the sound source 3 and the transducer array 6.

Next, the sound source 3 and the transducer array 6 are placed in shallow water. When a probe signal $P_i$ and a data signal $P_d$ are transmitted from the sound source 3, and the sound wave from the sound source 3 is received at the m-th element of the transducer array 6 (position $r_m$), the cross correlation function between the probe signal $P_i$ and the data signal $P_d$ can be expressed by a following equation (4).

[Expression 6]

$$R_{id}(\vec{r}_m; t) = \int_0^T P_d(\vec{r}_m; t' + t) P_i(\vec{r}_m; t') dt' \quad (4)$$

The cross correlation functions of all the elements 6a of the transducer array 6 can be added by a following equation (5).

[Expression 7]

$$S(t) = \sum_{m=1}^M w_m R_{id}(\vec{r}_m; t) \quad (5)$$

"S(t)" is known to be the sum of the cross-correlated signal across all array elements. This technique is called passive-phase conjugation.

The equations (4) and (5) are established in a literature by D. Rouseff, D. R Jackson, W. L. J. Fox, C. D. Jones, J. A. Ritcey and D. R. Dowling, "Underwater Acoustic Communication by Passive-Phase Conjugation; Theory and Experimental Results", IEEE J. Oceanic, Eng. 26, 821-831 (2001).

It is now considered the passive-phase conjugate processing for the sound wave traveling from the sound source 3. As shown in FIG. 2, the sound source 3 and the transducer 6 are placed in shallow water. The distance from sound source 3 to the transducer array 6 is 3 km. The target 2 is located at the position that is 1.5 km distant from the sound source 3 and the depth of 50 m. The material of the target 2 is iron, and the height and the width thereof are both 2 m.

The tone-burst wave of the center frequency of 500 Hz and the pulse width of 8 cycles is transmitted from the sound source 3, and the sound pulse is transmitted from the sound source 3 that is placed at the depth of 50 m. The sound pulse transmitted from the sound source 3 makes incident on the target 2, and the forward scattering waves 5 scattering forward from the target 2 are generated.

When the sound waves are transmitted from the sound source 3, the traveling waves 4 from the sound source 3 and the forward scattering waves 5 arrive at the transducer array 6 almost simultaneously. Then, passive-phase conjugate processing is applied to the signals received at the transducer array 6. That is, the correlation processing by the equation (4) is performed on the signals received at each of the elements 6a of the transducer array 6. Further, the cross correlation function (equation (5)) of all the elements 6a of the transducer array 6 is added. This series of correlation processing is the passive-phase processing.

Figure 7:
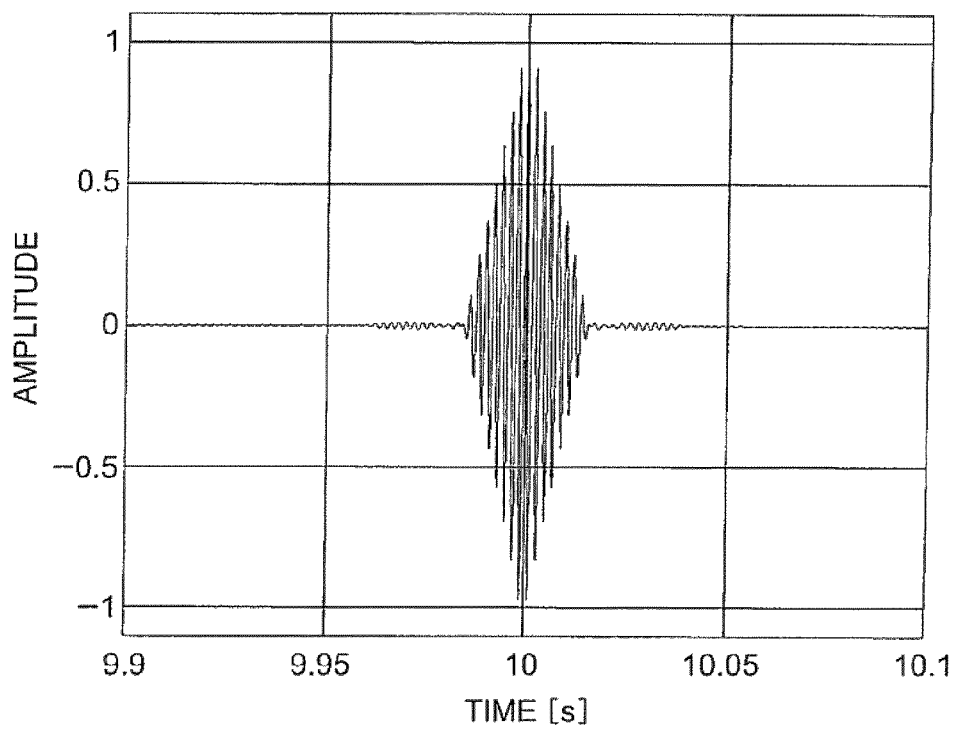
FIG. 7 is a chart showing a waveform of a signal obtained by applying passive-phase conjugate processing on a mixed wave of a traveling wave and a forward scattering wave.

FIG. 7 shows a passive-phase conjugate signal of mixed waves of the traveling waves 4 and the forward scattering waves 5 obtained through the passive-phase conjugate processing described above. As can be seen from FIG. 7, there is no influence caused by the forward scattering waves generated by the target 2, and the waveform is almost consistent with the waveform of the autocorrelation function of the sound pulse shown in FIG. 5A. The passive-phase conjugate processing is the autocorrelation function of the mixed wave, since the probe signal $P_i$ and the data signal $P_d$ in the equation (4) are the same.

In general, the level of the traveling waves 4 transmitted from the sound source 3 is larger than the level of the forward scattering waves 5, so that it is difficult to detect the forward scattering waves 5. In the exemplary embodiment of the invention, the sound waves (traveling waves 4) are transmitted in advance from the sound source 3 when there is no target 2, and the signals received at each of the elements 6a of the transducer array 6 are kept. Thereafter, the sound waves (traveling waves 4) are transmitted from the sound source 3 when there is the target 2, the mixed waves of the traveling waves 4 and the forward scattering waves 5 are received at each of the elements 6a of the transducer array 6, and the traveling waves 4 are subtracted from the mixed waves to separate and actualize the forward scattering waves 5.

Next, the passive-phase conjugate processing for the forward scattering waves 5 scattered forward from the target 2 will be investigated.

In the exemplary embodiment of the invention, the signals of the traveling waves 4 received at the transducer array when there is no target 2 is subtracted from the signals of the mixed waves received at the transducer array when there is the target 2. Then, the above-described passive-phase conjugate processing is performed on the subtracted and actualized forward scattering waves 5. The passive-phase conjugate processing performed on the signals (forward scattering waves 5) obtained after subtraction is the autocorrelation function of the subtracted waves, since the probe signal $P_i$ and the data signal $P_d$ in the equation (4) are the same.

Figure 8:
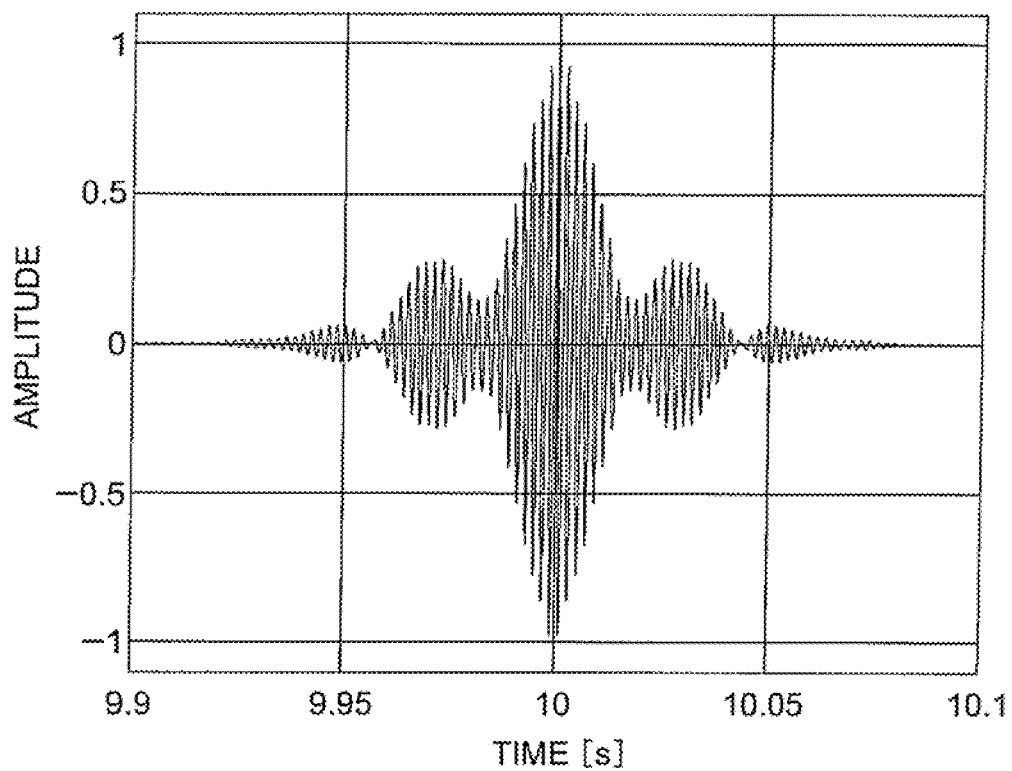
FIG. 8 is a chart showing a waveform of a signal obtained by applying passive-phase conjugate processing on a traveling wave which is transmitted from a sound source and making incident on a target.

The target 2 is placed at the point with a distance of 1.5 km and the depth of 50 m, and the sound wave pulses are transmitted from the sound source 3 that is placed at the depth of 50 m. After eliminating a component of the traveling waves 4 from the mixed waves received at the transducer array 6, the passive-phase conjugate processing is applied. FIG. 8 shows the waveform that is the result obtained by applying the passive-phase conjugate processing. The waveform shown in FIG. 8 is a symmetrical waveform with respect to the point "10 second" that is a repeating cycle of the sound wave pulse.

It is necessary to check that the waveform obtained in the manner described above by the passive-phase conjugate processing shown in FIG. 8 is the waveform that is obtained by applying the passive-phase conjugate processing on the sound wave pulses radiated forward from the sound source by having the position of the target 2 as the position of the new sound source. In order to check this, it is checked to see whether or not the target 2 is at the position of the new sound source (arbitrary position). In this case, the sound wave pulse radiated from the new sound source is not a tone-burst wave. The driving signal for radiating the sound wave pulse from the new sound source is the sound wave pulse which directly makes incident on the position of the new sound source from the original sound source 3. The pulse radiated from the new sound source is received at the transducer 6, and the passive-phase conjugate processing is applied on the received wave signal.

Figure 9:
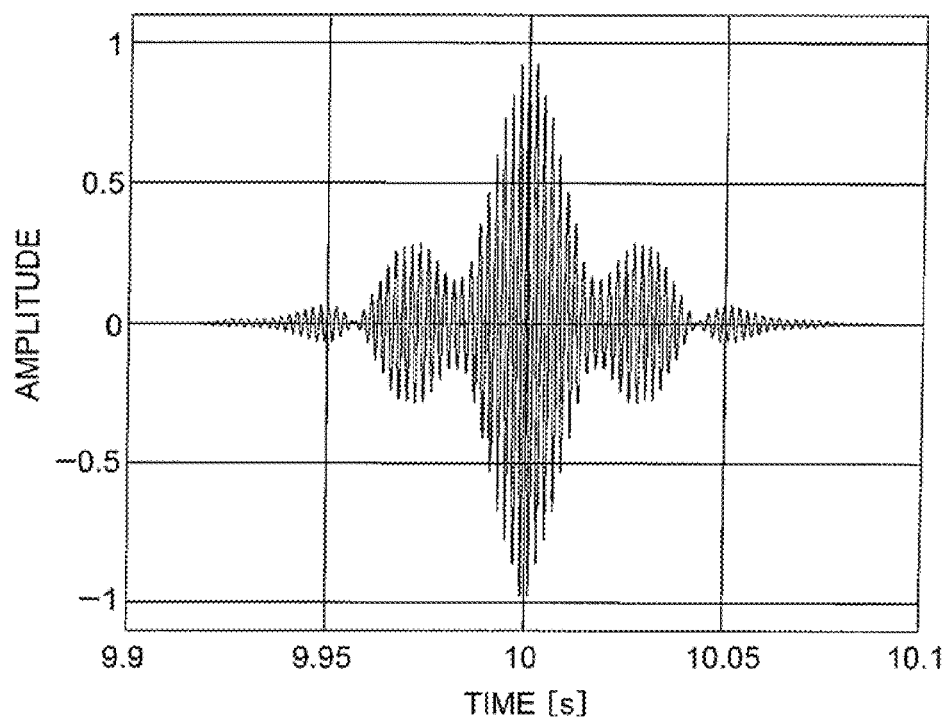
FIG. 9 is a chart showing a waveform of a signal obtained by applying passive-phase conjugate processing only on the forward scattering wave which scatters forward form the target.

FIG. 9 shows the waveform of the signal obtained by applying the passive-phase conjugate processing on the signal radiated from the new sound source. The waveform shown in FIG. 9 is substantially consistent with the waveform shown in FIG. 8. It is verified that the signal shown in FIG. 9 is only the forward scattering wave 5 from the target 2 obtained by performing the subtracting processing of the traveling wave 4 from the mixed wave received at the transducer array 6.

Next, the relation between the position of the target 2 and the passive-phase conjugate processing will be investigated. The propagation environment in the propagation space 1 is the same as that described in the investigations conducted above. Only the position of the target 2 is changed. The forward scattering waves 5 scattering forward from the target 2 whose position has been changed are received at the transducer array 6, and the passive-phase conjugate processing is applied on the received-wave signals.

Figure 10A:
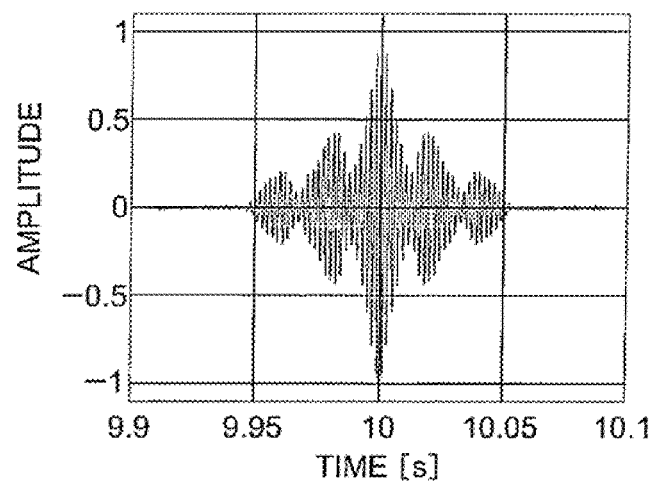
FIG. 10 shows charts of waveforms obtained by applying passive-phase conjugate processing as a parameter regarding a range of the target.
Figure 10B:
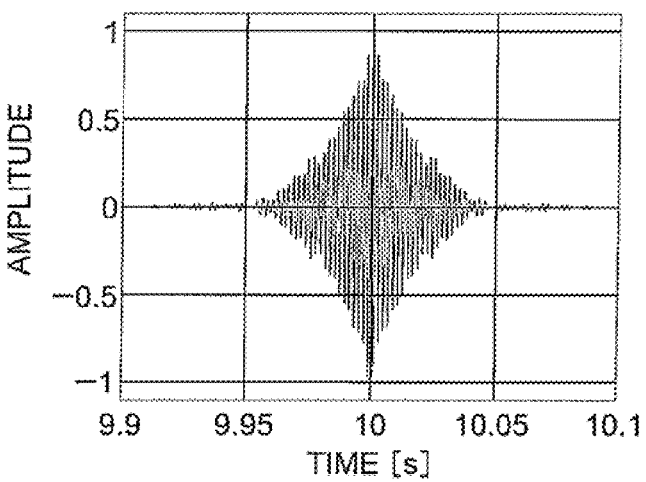
Figure 10C:
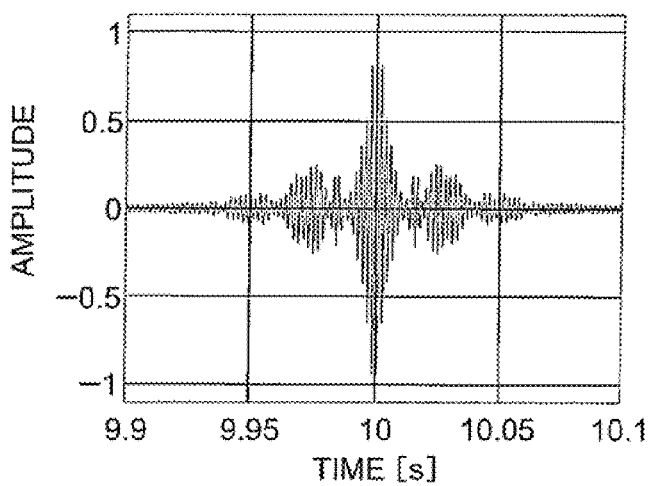
Figure 11:
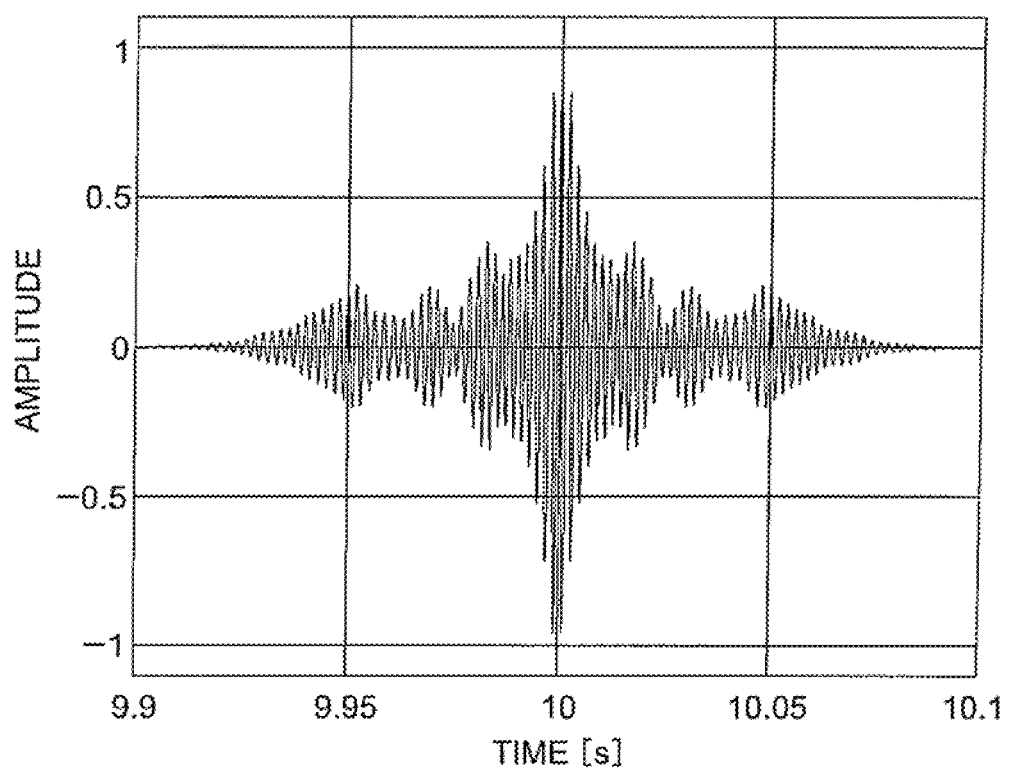
FIG. 11 is a chart showing a waveform obtained by applying passive-phase conjugate processing when the range of the target is changed.

FIGS. 10A, 10B, and 10C show the waveforms obtained by performing the passive-phase conjugate processing as the parameter regarding the distance to the target 2. The distances to the target 2 (the position with respect to the sound source 3) are 1.3 km, 1.6 km, and 1.7 km. The depths of the target 2 are all 50 m. As can be seen from FIG. 10, changes in the waveforms due to the passive-phase conjugate processing are generated largely due to the distance to the target 2. Similarly, when the depth of the target 2 changes, the waveform after performing the passive-phase conjugate processing changes largely. FIG. 11 shows the waveform obtained by performing the passive-phase conjugate processing when the distance to the target 2 is 1.5 km and the depth of the target 2 changes to 20 m. From FIG. 10 and FIG. 11, it is considered that there is a close relationship between the position of the target 2 and the waveform obtained by the passive-phase processing.

From the results of the above-described investigations, it can be seen that the result obtained by performing the passive-phase conjugate processing on the forward scattering waves 5 scattering forward from the target 2 is directly associated with the sound wave pulses which make incident on the target 2 by being transmitted from the sound source 3. Therefore, the waveform obtained by performing the passive-phase conjugate processing on the forward scattering waves 5 scattering forward from the target 2 is the same as the correlation waveform (autocorrelation function) of the sound wave pulse which makes incident on the position of the target 2 by being transmitted from the sound source 3. In the meantime, the sound wave pulse making incident on an arbitrary position in a sound field by having the sound source 3 as a reference can be determined uniquely by the propagation environment. That is, the result obtained by performing the passive-phase conjugate processing on the forward scattering waves 5 scattering forward from the target 2 holds the information regarding the position of the target 2.

The above-described relation can be used for searching the target 2 as the matched field method. When the distance from the target 2 to the sound source 3 is 1.5 km and the depth of the target 2 is 50 m, the correlation function between the autocorrelation function of the sound wave pulse making incident on the arbitrary position by having the sound source 3 as the reference and the result obtained by performing the passive-phase conjugate processing on the sound wave pulse radiated forward from the arbitrary point comes to be in a form as shown in FIG. 11.

As can be seen from FIG. 12, it is clearly shown that position H that has the highest correlation value obtained based on the correlation between the signal (passive-phase conjugated signal of the forward scattering waves) generated by performing the passive-phase conjugate processing on the forward scattering waves 5 and the signal (autocorrelation processed signal of the traveling waves) generated by performing the autocorrelation processing on the traveling waves 4 which make incident on the position of the target 2 that is at the arbitrary position within the propagation space by having the sound source 3 as the reference position is the position of the target 2.

From the results of the above-described investigations, it has been proved that the result obtained by performing the passive-phase conjugate processing on the sound wave pulse radiated from the arbitrary position in the propagation space by having the sound source 3 as the reference matches the result obtained by performing the autocorrelation processing of the sound wave pulse which makes incident on the arbitrary position from the sound source 3. When the target 2 is at the arbitrary position, the forward scattering waves therefrom correspond to the sound wave pulses which make incident on the target 2. Therefore, the result (autocorrelation processed signal of the traveling waves) obtained by performing the autocorrelation processing on the traveling waves which make incident on the position of the target 2 from the sound source 3 matches the result (passive-phase conjugated signal of the forward scattering waves) obtained by performing the passive-phase conjugate processing on the signal of the forward scattering waves 5 scattering forward from the target 2. Therefore, the correlation value between the autocorrelation processed signal of the traveling waves and the passive-phase conjugated signal of the forward scattering waves 5 becomes high, and the correlation value when there is no target 2 at the arbitrary position becomes low.

The exemplary embodiment of the invention is characterized to search the target 2 in the propagation space 1 where the sound waves propagate, such as in shallow water, through monitoring whether or not a passive-phase conjugated signal S2 which is the result obtained by performing the passive-phase conjugate processing on the sound waves (traveling waves 4) which are transmitted from the sound source 3 and make incident on the arbitrary position by having the sound source 3 as the reference in the propagation space 1 matches an autocorrelation processed signal S1 of the traveling waves 4, which is the result obtained by performing the autocorrelation processing on the sound waves which are transmitted from the sound source 3 and make incident on the same position as that of the arbitrary position. This is because the correlation value between the passive-phase conjugated signal S2 and the autocorrelation processed signal S1 becomes the highest when there is the target 2 at the arbitrary position. Detailed explanations thereof will be provided hereinafter.

Figure 1:
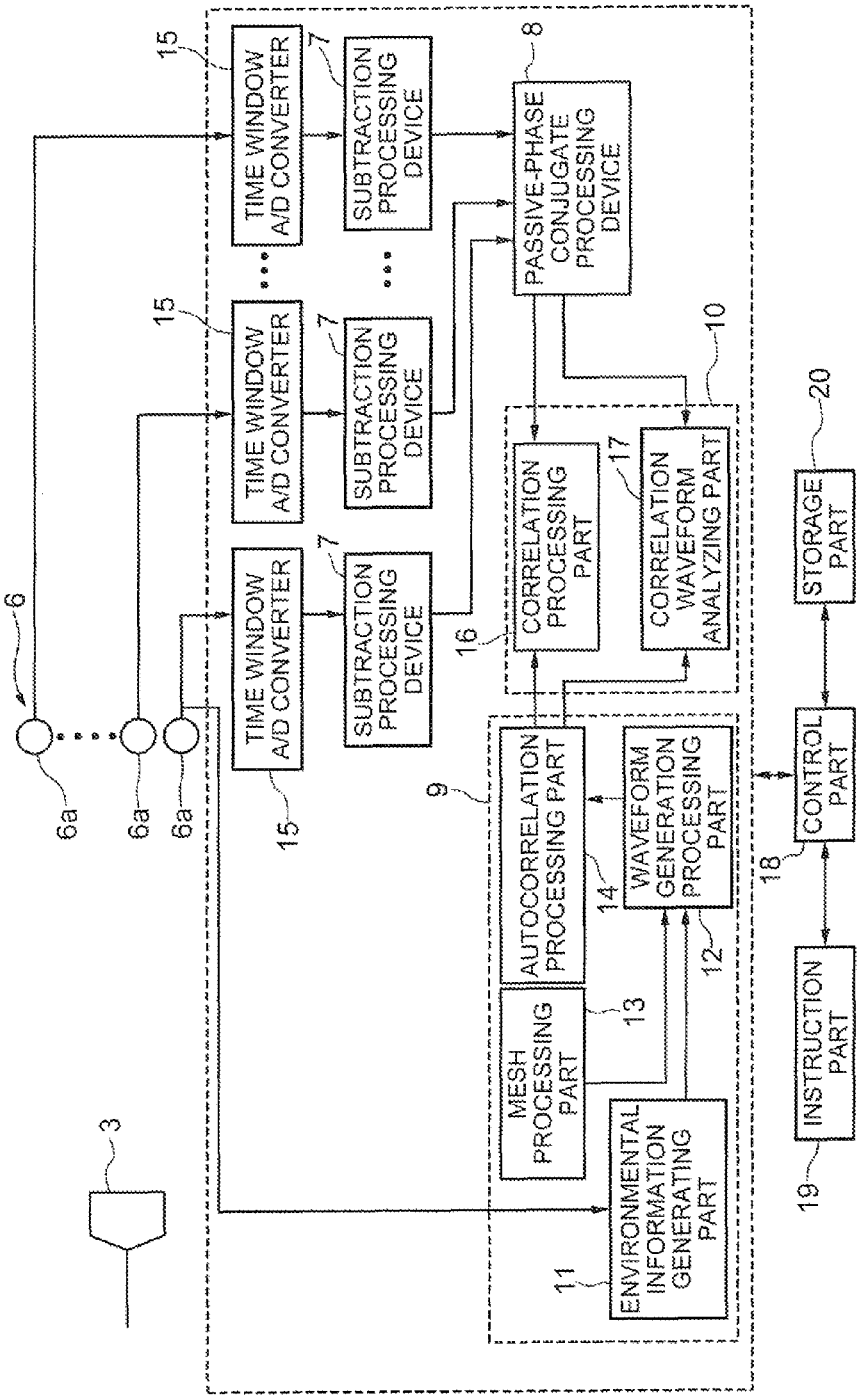
FIG. 1 is a block diagram showing a target searching device according to an exemplary embodiment of the invention.

As shown in FIG. 1, the target searching device according to the exemplary embodiment of the invention is basically structured to search the target 2 by using the traveling waves 4 from the sound source making incident on the target 2 that is within the propagation space 1 and the forward scattering waves 5 scattering forward from the target 2. The target searching device includes: the sound source 3 (see FIG. 2) for transmitting sound waves into the propagation space; the transducer array 6 (see FIG. 2) placed at an area for receiving the forward scattering waves 5 scattering forward from the target 2 within the propagation space 1; a subtraction processing device 7 which separates the forward scattering waves 5 by subtracting the traveling waves 4 which directly travel towards the transducer array 6 from the mixed waves of the forward scattering waves 5 and the traveling waves 4 which directly travel towards the transducer array 6; a passive-phase conjugate processing device 8 which generates the passive-phase conjugated signal S2 of the forward scattering waves 5 by performing the passive-phase conjugate processing on the forward scattering waves 5 that are separated by the subtraction processing device 7; an autocorrelation processing device 9 which generates the autocorrelation processed signal S1 of the traveling waves 4 by performing the autocorrelation processing on the traveling waves 4 which make incident on the arbitrary position within the propagation space 1 having the sound source 3 as the reference position; and a correlation device 10 which judges the similarity between the autocorrelation processed signal S1 and the passive-phase conjugated signal S2.

In this exemplary embodiment of the invention, the sound waves (traveling waves 4) are transmitted from the sound source 3 into the propagation space 1, and the traveling waves 4 directly traveled to the transducer array 6 are subtracted from the mixed waves of the forward scattering waves 5 and the traveling waves 4 which directly travel to the transducer array 6 to separate the forward scattering waves 5. For separating the forward scattering waves 5, the signal of the traveling waves 4 is obtained in advance by receiving the traveling waves 4 propagating within the propagation space 1 where no target 2 exists by the transducer array 6. Then, the mixed waves are received at the transducer array 6, and the signal of the traveling waves 4 which travel directly to the transducer array 6 is subtracted from the signal of the mixed waves to separate the forward scattering waves 5.

Then, the passive-phase conjugate processing is performed on the separated forward scattering waves 5 by the passive-phase conjugate processing device 8 to generate the passive-phase conjugated signal S2 of the forward scattering waves 5. Further, the autocorrelation processing is performed by the autocorrelation processing device 9 on the traveling waves 4 which make incident on the arbitrary position within the propagation space 1 by having the sound source 3 as the reference position so as to generate the autocorrelation processed signal S1 of the traveling waves 4. Then, the similarity between the autocorrelation processed signal S1 and the passive-phase conjugated signal S2 is judged by the correlation device 10.

In the above, explanations are provided by referring to the case where the target searching device according to the exemplary embodiment of the invention is built as hardware. However, the present invention is not limited only to such case. That is, it is also possible to achieve the functions executed by the target searching device according to the exemplary embodiment of the invention by having the functions of the target searching device according to the exemplary embodiment of the invention built as a program, and by having a computer to execute the program. In that case, the program is recorded in a recording medium, and the program in that state can be a target of business transactions.

The target searching device according to the exemplary embodiment of the invention will be described in more details by using a concretive example.

The autocorrelation processing device 9 includes an environmental information generating part 11, a waveform generation processing part 12, a mesh processing part 13, and an autocorrelation processing part 14.

The environmental information generating part 11 fetches calibrated signals which are transmitted from the sound source 3 and received/calibrated at the transducer array 6, eliminates unnecessary signals, and performs A/D conversion to use the obtained signals as the calibration signals. Further, the environmental information generating part 11 calculates constants of an actual sea area, i.e., constants of the actual sea area where the sound wave beams propagate (acoustic constant in the sea), based on the calibration signals. This will be described in a specific manner.

The target searching device according to the exemplary embodiment of the invention is used in relatively shallow water such as a continental shelf. The sea acoustic constants regarding the sound wave propagation in that environment are data such as the depth of water, the underwater sound speed, sediment in the seabed (sound speed, density), etc. Further, the sea acoustic constants regarding the sound wave pulses in the environment are the data such as the center frequency of the sound wave pulse, the spectrum of the sound wave pulse, the band width of the sound wave pulse, etc. The data of the depth of the water for determining the sea acoustic constants can be obtained through direct measurements by using a measuring instrument such as an echo sounder. The underwater sound speed data for determining the sea acoustic constants can be obtained from a known sound speed formula such as a formula by Medwin (H. Medwin) by measuring the water temperature.

Regarding the data of the sediment for determining the sea acoustic constants, a rough value can be estimated from a chart. A more accurate value can be obtained by a known calibration method. That is, the data regarding the sediment in the actual sea area is obtained by receiving, at the transducer array 6, the signals transmitted from a calibrated sound source that is hung into a searching sea area where it is expected to have the target, and by performing a calculation while changing the received-wave signals and the constants of the sediment. Note here that the sea acoustic constants mean environmental factors which are the main factors influencing the propagation of the sound waves when the sound waves actually propagate under the sea. The sea acoustic constants are used herein, since there is assumed the case of searching the target 2 under the sea. However, the present invention is not limited only to such case. In cases where those other than the sea are considered as the propagation spaces, the acoustic constants are environmental factors which are the main factors influencing the propagation of the sound waves when the sound waves actually propagate in the propagation spaces.

The data for determining the sea acoustic constants in the actual sea area regarding the sound wave propagation and the sound wave pulses described above are inputted to the environmental information generating part 11. The environmental information generating part 11 determines the sea acoustic constants in the actual sea area based on the inputted data for determining the sea acoustic constants and the calibration signals. The environmental information generating part 11 outputs the determined sea acoustic constants of the actual sea area towards the waveform generation processing part 12. The sea acoustic constants are used herein, since there is assumed the case of searching the target 2 under the sea. However, the present invention is not limited only to such case. In cases where those other than the sea are considered as the propagation spaces, the environmental information generating part 11 outputs actual acoustic constants which are the main factors influencing the propagation of the sound waves when the sound waves actually propagate in the propagation spaces.

Figure 4:
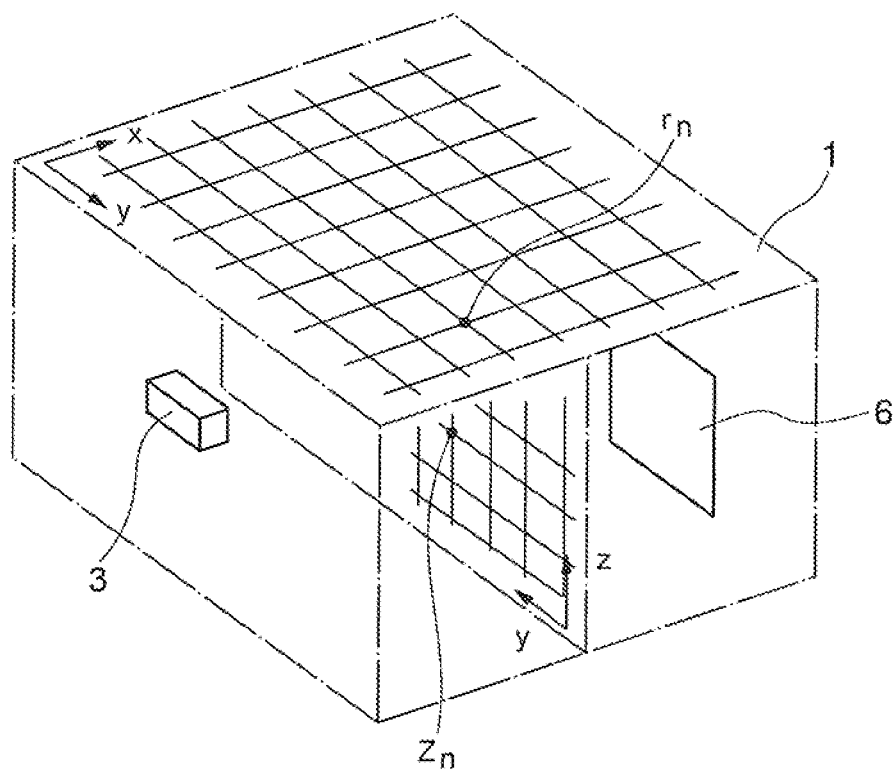
FIG. 4 is an illustration showing a state where an arbitrary position is postulated by a mesh processing part in the exemplary embodiment of the invention.

As shown in FIG. 4, the mesh processing part 13 assumes the position of the target 2 within the propagation space 1 between the sound source 3 and the transducer array 6, and outputs information of the assumed arbitrary positions to the waveform generation processing part 12. Specifically, assuming that the propagation space 1 is under the sea, the mesh processing part 13 sets an arbitrary position (distance) on an x-y plane on horizontal coordinates by setting the distance between the sound source 3 and the transducer array 6 as "r", as shown in FIG. 4. Further, as shown in FIG. 4, the mesh processing part 13 sets an arbitrary position (depth) on a y-z plane on vertical coordinates by setting the depth from the sea surface 1a to the seabed 1b as "z".

Then, the mesh processing part 13 sequentially shifts the arbitrary position within the x-y plane by changing the distance r with respect to the sound source 3 and sequentially shifts the arbitrary position within the y-z plane by changing the depth z with respect to the sound source 3, and outputs the information of the arbitrary positions (distance, depth) to the waveform generation processing part 12.

The waveform generation processing part 12 finds a new sound source at the point where the sound waves transmitted from the sound source 3 make incident, i.e., the sound wave pulse at an arbitrary position in a sound field by having the sound source 3 as the reference, by using equations (6) and (7) based on the acoustic constants outputted from the environmental information generating part 11 and the positional information outputted from the mesh processing part 13.

[Expression 8]

$$P(r, z, t) = \frac{1}{2\pi} \int_{\omega_b}^{\omega_b} S(\omega) P(r, z, \omega) e^{-i\omega t} d\omega \quad (6)$$

The sound wave pulse obtained from the equation (6) is the sound wave pulse that is propagated from the sound source 3 to the arbitrary position in a normal manner. In the equation (6), "$S(\omega)$" is the frequency spectrum of the sound wave pulse transmitted from the sound source 3. "$P(r, z, \omega)$" is the sound pressure at the arbitrary point corresponding to the frequency spectrum $S(\omega)$, which is obtained by a typical normal mode method or the like, and "$\omega_b$" is the band width.

The waveform generation processing part 12 obtains the sound pressure "$P(r, z, \omega)$" of the sound wave with an angular frequency of $\omega$ at the arbitrary point (r, z) according to the equation (7) by using a coupled mode method, for example, and substitutes it to the equation (6).

[Expression 9]

$$P_j = \sum_{m=1}^{M} \{A_{j,m} H1_{j,m}(r) + B_{j,m} H2_{j,m}(r)\} \phi(z, \lambda_{j,m}) \quad (7)$$

In the equation (7), "j" means a sectioned area (distance) in the horizontal direction, and "$\phi(z, \lambda_j, m)$" is a mode function.

The equation (7) is established in a literature by R. B. Evans, "A coupled mode solution for acoustic propagation in a wave guide with stepwise depth variations of a penetrable bottom", J. Acoust. Soc. Am., 74, 188-193 (1983).

The waveform generation processing part 12 outputs, to the autocorrelation processing part 14, the sound wave (pulse) of the arbitrary position within the propagation space 1 by having the sound source 3 as the reference, which is calculated according to the equations (6) and (7).

The autocorrelation processing part 14 performs the correlation processing on the sound wave signal according to the equation (4) based on the sound wave information received from the waveform generation processing part 12. In this case, the probe signal $P_i$ and the data signal $P_d$ in the equation (4) are the same, so that the correlation processing performed on the traveling waves 4 which make incident on the arbitrary position results in a form of the autocorrelation processing. Therefore, the autocorrelation processing part 14 generates the autocorrelation processed signal S1 of the traveling waves 4 by applying the autocorrelation processing on the traveling waves 4 which make incident on the arbitrary position within the propagation space 1 by having the sound source 3 as the reference.

[Expression 10]

$$R_{id}(\vec{r}_m; t) = \int_0^T P_d(\vec{r}_m; t' + t) P_i(\vec{r}_m; t') dt' \quad (4)$$

The autocorrelation processing signal S1 outputted from the autocorrelation processing part 14 turns out as the signal in the waveform that is shown in FIG. 8, when the target 2 is at the arbitrary position.

The sound wave pulses transmitted from the sound source 3 and propagated within the propagation space 1 are received at the transducer array 6. The transducer array 6 converts the received sound waves to received-wave signals that are electric signals, and outputs the received-wave signals to the subtraction processing device 7.

The subtraction processing device 7 stores in advance the received-wave signals of the traveling waves 4 which directly travel towards the transducer array 6 from the sound source 3 when the target 2 is not within the propagation space 1. When the traveling waves 4 including the forward scattering waves 5 are received at the transducer array 6 under a state where there is the target 2 within the propagation space 1, the subtraction processing device 7 subtracts the traveling waves 4 from the mixed weaves of the traveling waves 4 and the forward scattering waves 5 to separate the forward scattering waves 5, and outputs the received-wave signals of the separated forward scattering waves 5 to the phase-conjugate processing device 8.

Upon receiving subtracted signal that is subtraction-processed by the subtraction processing device 7, the passive-phase conjugate processing device 8 generates the passive-phase conjugated signal S2 of the forward scattering waves 5 by performing the passive-phase conjugate processing on the subtracted signal according to the equations (4) and (5). The passive-phase conjugate processing device 8 outputs the passive-phase conjugated signal S2 of the forward scattering waves 5 to the correlation device 10.

[Expression 11]

$$R_{id}(\vec{r}_m; t) = \int_0^T P_d(\vec{r}_m; t' + t) P_i(\vec{r}_m; t') dt' \quad (4)$$

[Expression 12]

$$S(t) = \sum_{m=1}^{M} w_m R_{id}(\vec{r}_m; t) \quad (5)$$

The passive-phase conjugate processing device 8 outputs the passive-phase conjugated signal S2 that has the waveform of FIG. 9, when there is the target 2 at the arbitrary position. The probe signal $P_i$ and the data signal $P_d$ are the same, so that the passive-phase conjugate processing performed by the passive-phase conjugate processing device 8 results in the form of the autocorrelation processing.

The correlation device 10 includes a correlation processing part 16 and a correlation waveform analyzing part 17.

Upon receiving the autocorrelation processed signal S1 of the traveling waves 4 from the autocorrelation processing device 9 and the passive-phase conjugated signal S2 of the forward scattering waves 5 from the passive-phase conjugate processing device 8, the correlation processing part 16 judges the similarity between the passive-phase conjugated signal S2 and the autocorrelation processed signal S1 based on a typical cross correlation equation (8). The correlation processing part 16 judges the position whose correlation value obtained by judging the correlation between the autocorrelation processed signal S1 and the passive-phase conjugated signal S2 is the highest as the target position.

[Expression 13]

$$R_{xx}(k) = \frac{1}{N} \sum_{n=0}^{N-1-k} S1(n)S2(n+k) \quad (8)$$

In the equation (8), "$S1(n)$" is the data of the autocorrelation processed signal S1, and "$S2(n+k)$" is the data of the passive-phase conjugated signal S2.

The equation (8) is a cross correlation function depicted in a literature by EHARA Yoshiro, "Digital Signal Processing", pp. 46-47, Tokyo Denki University Press, issued on Feb. 20, 1996, for example.

Upon receiving the autocorrelation processed signal S1 of the traveling waves 4 from the autocorrelation processing device 9 and the passive-phase conjugated signal S2 of the forward scattering waves 5 from the passive-phase conjugate processing device 8, the correlation waveform analyzing part 17 analyzes the similarity between the passive-phase conjugated signal S2 and the autocorrelation processed signal S1 based on the equation (4), and displays an image thereof. FIG. 12 shows an example of the image displayed by the correlation waveform analyzing part 17.

A control part 18 controls the autocorrelation processing device 9, the passive-phase conjugate processing device 8, the correlation device 10, and other structural elements in a collective manner. Reference numeral 20 is a storage part which provides necessary information for the operations of the control part 18 and a work area necessary for arithmetic operations. Reference numeral 19 is an instruction part which outputs data outputted via the control part 18.

Next, described is a case of searching the target 2 which exists in a propagation space such as under the sea by using the target searching device according to the exemplary embodiment of the invention.

The environmental information generating part 11 fetches calibrated signals which are transmitted from the sound source 3 and received/calibrated at the transducer array 6, eliminates unnecessary signals, and performs A/D conversion to use the obtained signals as the calibration signals. Further, the environmental information generating part 11 calculates constants of an actual sea area, i.e., constants of the actual sea area where the sound wave beams propagate (acoustic constants in the sea), based on the calibration signals. The environmental information generating part 11 then outputs, to the waveform generation processing part 12, the actual acoustic constants which are the main factors for influencing the propagation of the sound waves when the sound waves actually propagate within the propagation space.

In the meantime, the mesh processing part 13 sequentially shifts the arbitrary position within the x-y plane by changing the distance r with respect to the sound source 3 and sequentially shifts the arbitrary position within the y-z plane by changing the depth z with respect to the sound source 3, and outputs the information of the arbitrary positions (distance, depth) to the waveform generation processing part 12.

The waveform generation processing part 12 finds a new sound source at the point where the sound waves transmitted from the sound source 3 make incident, i.e., the sound wave pulse at an arbitrary position in a sound field by having the sound source 3 as the reference, by using equations (6) and (7) based on the acoustic constants outputted from the environmental information generating part 11 and the positional information outputted from the mesh processing part 13. Then, the waveform generation processing part 12 outputs the sound wave pulse at the arbitrary position within the propagation space 1 to the autocorrelation processing part 16.

Figure 3:
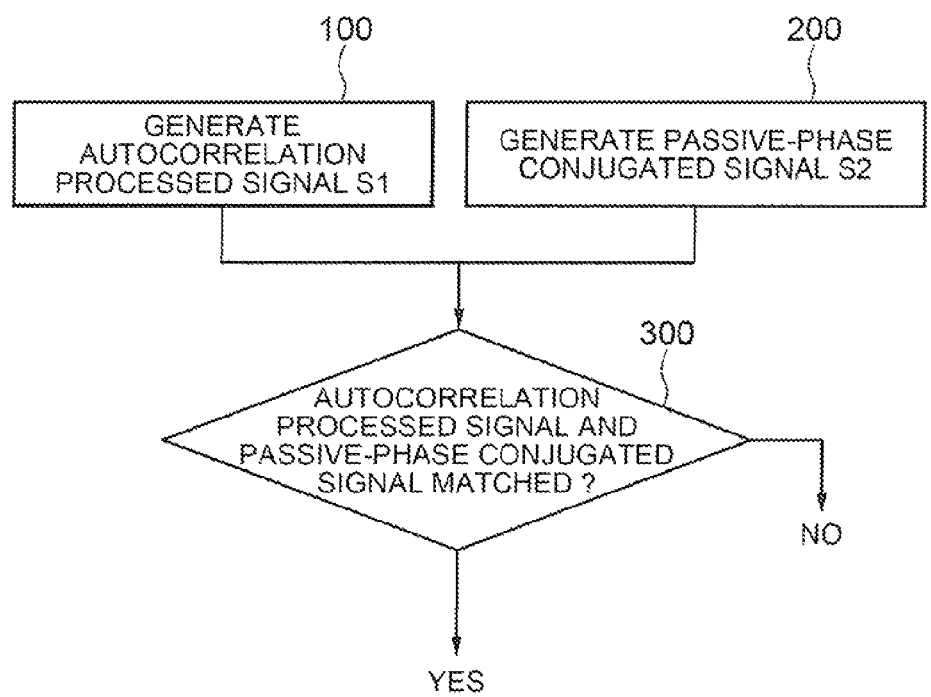
FIG. 3 is a flowchart showing a case where a target is searched by using the target searching device according to the exemplary embodiment of the invention.

The autocorrelation processing part 14 performs the correlation processing on the sound wave signal according to the equation (4) based on the sound wave information received from the waveform generation processing part 12, and performs correlation processing on the traveling waves 4 which make incident on the arbitrary position within the propagation space 1 by having the sound source 3 as the reference to generate the autocorrelation processed signal S1 of the traveling waves 4 (step 100 of FIG. 3).

The autocorrelation processing signal S1 outputted from the autocorrelation processing part 14 turns out as the signal in the waveform of FIG. 8, when the target 2 is at the arbitrary position.

When performing the processing for generating the autocorrelation processed signal S1, the processing for generating the passive-phase conjugated signal S2 is executed at the timing for outputting the tone-burst wave from the sound source 3.

That is, the sound wave pulses transmitted from the sound source 3 and propagated within the propagation space 1 are received at the transducer array 6. The transducer array 6 converts the received sound waves to received-wave signals that are electric signals, and outputs the received-wave signals to the subtraction processing device 7.

The subtraction processing device 7 stores in advance the received-wave signals of the traveling waves 4 which directly travel towards the transducer array 6 from the sound source 3 when the target 2 is not within the propagation space 1. When the traveling waves 4 including the forward scattering waves 5 are received at the transducer array 6 under a state where there is the target 2 within the propagation space 1, the subtraction processing device 7 subtracts the traveling waves 4 from the mixed weaves of the traveling waves 4 and the forward scattering waves 5 to separate the forward scattering waves 5, and outputs the received-wave signals of the separated forward scattering waves 5 to the phase-conjugate processing device 8.

Upon receiving subtracted signal that is subtraction-processed by the subtraction processing device 7, the passive-phase conjugate processing device 8 generates the passive-phase conjugated signal S2 of the forward scattering waves 5 by performing the passive-phase conjugate processing on the subtracted signal according to the equations (4) and (5). The passive-phase conjugate processing device 8 outputs the passive-phase conjugated signal S2 of the forward scattering waves 5 to the correlation device 10 (step 200 of FIG. 3).

The passive-phase conjugate processing device 8 outputs the passive-phase conjugated signal S2 in the waveform as shown in FIG. 9, when there is the target 2 at the arbitrary position. The probe signal $P_i$ and the data signal $P_d$ are the same, so that the passive-phase conjugate processing performed by the passive-phase conjugate processing device 8 results in the form of the autocorrelation processing.

Upon receiving the autocorrelation processed signal S1 of the traveling waves 4 from the autocorrelation processing device 9 and the passive-phase conjugated signal S2 of the forward scattering waves 5 from the passive-phase conjugate processing device 8, the correlation processing part 16 judges the similarity between the passive-phase conjugated signal S2 and the autocorrelation processed signal S1 based on the equation (8) (step 300 of FIG. 3). The correlation processing part 16 judges the position whose correlation value obtained by judging the correlation between the autocorrelation processed signal S1 and the passive-phase conjugated signal S2 is the highest as the target position.

Upon receiving the autocorrelation processed signal S1 of the traveling waves 4 from the autocorrelation processing device 9 and the passive-phase conjugated signal S2 of the forward scattering waves 5 from the passive-phase conjugate processing device 8, the correlation waveform analyzing part 17 analyzes the similarity between the passive-phase conjugated signal S2 and the autocorrelation processed signal S1 based on the equation (4), and displays an image thereof as in FIG. 12.

As described above, it is possible with the exemplary embodiment of the invention to accurately search the target existing within the propagation space through utilizing the fact that the autocorrelation function for the sound wave signals from the sound source making incident on the target within the propagation space matches the result obtained by performing the passive-phase conjugation on the forward scattering waves which scatter forward from the target.

Further, the exemplary embodiment of the invention searches the position of the target by finding the correlation between the autocorrelation processed signal of the traveling waves obtained by performing the autocorrelation processing on the traveling waves which make incident on the arbitrary position within the propagation space by having the sound source as the reference and the passive-phase conjugated signal of the forward scattering waves obtained by performing the passive-phase conjugate processing on the forward scattering waves separated from the mixed waves by the subtraction processing. Therefore, it is possible to shorten the time required for searching the target. This is because the target for finding the correlation with respect to the passive-phase conjugated signal is the autocorrelation processed signal obtained by performing the autocorrelation processing on the traveling waves, so that it is unnecessary to perform time-reversal processing. As a result, the time can be shortened.

As an exemplary advantage according to the invention, it is possible to search the target existing within a propagation space accurately through utilizing the fact that the autocorrelation function for the sound wave signal from the sound source making incident on the target within the propagation space becomes consistent with the result obtained by performing the passive-phase conjugation on the forward scattering wave which scatters forward from the target.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

INDUSTRIAL APPLICABILITY

The present invention makes it possible to search objects to be detected by having a wide range of objects as the targets.

What is claimed is:

1. A target searching device for searching presence or absence of a target within a propagation space, which searches the target by using, from a backward scattering wave scattering backward from the target and a forward scattering wave scattering forward from the target, the forward scattering wave, and by using the forward scattering wave and a traveling wave from a sound source making incident on the target within the propagation space, the device comprising:
   a sound source which transmits a sound wave that is a probe signal into the propagation space;
   a transducer array placed in an area to receive the forward scattering wave that is a data signal which scatters forward from the target when present within the propagation space;
   a subtraction processing device which performs subtraction processing for subtracting the traveling wave that is the probe signal directly traveling from the sound source towards the transducer array when the target does not exist within the propagation space from a mixed wave of the forward scattering wave that is the data signal and the traveling wave that is the probe signal directly traveling from the sound source towards the transducer array so as to separate a difference obtained by the subtraction processing as the forward scattering wave that is the data signal;
   a passive-phase conjugate processing device which performs passive-phase conjugate processing on the forward scattering wave separated by the subtraction processing device so as to generate a passive-phase conjugated signal of the forward scattering wave;
   an autocorrelation processing device which performs autocorrelation processing on the traveling wave that is the sound wave transmitted from the sound source, which makes incident on an arbitrary position within the propagation space by having the sound source as a reference position so as to generate an autocorrelation processed signal of the traveling wave; and
   a correlation device which judges presence or absence of the target from a similarity between the autocorrelation processed signal and the passive-phase conjugated signal.

2. The target searching device as claimed in claim 1, wherein the correlation device judges a position whose correlation value obtained based on a correlation between the autocorrelation processed signal and the passive-phase conjugated signal takes a highest value as a target position.

3. The target searching device as claimed in claim 1, wherein the sound source transmits a pulse-like tone-burst wave as the traveling wave.

4. A non-transitory computer readable recording medium storing a target searching program for executing a control for searching presence or absence of a target within a propagation space by using a computer, which controls searching of the target by using, from a backward scattering wave scattering backward from the target and a forward scattering wave scattering forward from the target, the forward scattering wave, and by using the forward scattering wave and a traveling wave from a sound source making incident on the target within the propagation space, the program enabling the computer to execute:

a function which performs subtract processing for subtracting the traveling wave that is a probe signal directly traveling from the sound source towards the transducer array when the target does not exist within the propagation space from a mixed wave of the forward scattering wave that is a data signal and the traveling wave that is the probe signal directly traveling from the sound source towards the transducer array so as to separate a difference obtained by the subtraction processing as the forward scattering wave that is the data signal;

a function which performs passive-phase conjugate processing on the forward scattering wave separated by the subtraction processing device so as to generate a passive-phase conjugated signal of the forward scattering wave;

a function which performs autocorrelation processing on the traveling wave transmitted from the sound source so as to generate an autocorrelation processed signal of the traveling wave; and a function which judges a similarity between the autocorrelation processed signal and the passive-phase conjugated signal.

5. The non-transitory computer readable recording medium storing target searching program as claimed in claim 4, which enables the computer to execute a function which judges a position whose correlation value obtained based on a correlation between the autocorrelation processed signal and the passive-phase conjugated signal takes a highest value as a target position.

6. A target searching method for searching presence or absence of a target within a propagation space, which searches the target by using, from a backward scattering wave scattering backward from the target and a forward scattering wave scattering forward from the target, the forward scattering wave, and by using the forward scattering wave and a traveling wave from a sound source making incident on the target within the propagation space, the method comprising:

transmitting a sound wave that is a probe signal into the propagation space from the sound source;

performing subtraction processing for subtracting the traveling wave that is a probe signal directly traveling from the sound source towards the transducer array when the target does not exist within the propagation space from a mixed wave of the forward scattering wave that is a data signal and the traveling wave that is the probe signal directly traveling from the sound source towards the transducer array so as to separate a difference obtained by the subtraction processing as the forward scattering wave that is the data signal;

performing passive-phase conjugate processing on the forward scattering wave separated by the subtraction processing device so as to generate a passive-phase conjugated signal of the forward scattering wave;

performing autocorrelation processing on the traveling wave that is the sound wave transmitted from the sound source, which makes incident on an arbitrary position within the propagation space by having the sound source as a reference position so as to generate an autocorrelation processed signal of the traveling wave; and judging a similarity between the autocorrelation processed signal and the passive-phase conjugated signal.

7. The target searching method as claimed in claim 6, wherein a position whose correlation value obtained based on a correlation between the autocorrelation processed signal and the passive-phase conjugated signal takes a highest value is judged as a target position.

8. The target searching method as claimed in claim 6, wherein a pulse-like tone-burst wave is transmitted as the traveling wave.

9. A target searching means for searching presence or absence of a target within a propagation space, which searches the target by using, from a backward scattering wave scattering backward from the target and a forward scattering wave scattering forward from the target, the forward scattering wave, and by using the forward scattering wave and a traveling wave from a sound source making incident on the target within the propagation space, the means comprising:

sound source means for transmitting a sound wave that is a probe signal into the propagation space;

a transducer array placed in an area to receive the forward scattering wave that is a data signal which scatters forward from the target when present within the propagation space;

subtraction processing means for performing subtracting processing for subtracting the traveling wave that is the probe signal directly traveling from the sound source means towards the transducer array when the target does not exist within the propagation space from a mixed wave of the forward scattering wave and the traveling wave that is the probe signal directly traveling from the sound source means towards the transducer array so as to separate a difference obtained by the subtraction processing as the forward scattering wave that is the data signal;

passive-phase conjugate processing means for performing passive-phase conjugate processing on the forward scattering wave separated by the subtraction processing means so as to generate a passive-phase conjugated signal of the forward scattering wave;

autocorrelation processing means for performing autocorrelation processing on the traveling wave that is the sound wave transmitted from the sound source means, which makes incident on an arbitrary position within the propagation space by having the sound source as a reference position so as to generate an autocorrelation processed signal of the traveling wave; and correlation means for judging presence or absence of the target from a similarity between the autocorrelation processed signal and the passive-phase conjugated signal.

10. A target searching device for searching presence or absence of a target within a propagation space, which searches the target by using, from a backward scattering wave scattering backward from the target and a forward scattering wave scattering forward from the target, the forward scattering wave, and by using the forward scattering wave and a traveling wave from a sound source making incident on the target within the propagation space, the device comprising:

a sound source which transmits a sound wave that is a problem signal into the propagation space;

a transducer array placed in an area to receive the forward scattering wave that is a data signal which scatters forward from the target when present within the propagation space;

a subtraction processing device which performs subtraction processing for subtracting the traveling wave that is the probe signal directly traveling from the sound source towards the transducer array when the target does not exist within the propagation space from a mixed wave of the forward scattering wave that is the data signal and the traveling wave that is the probe signal directly traveling from the sound source towards the transducer array so as to separate a difference obtained by the subtraction processing as the forward scattering wave that is the data signal;
a passive-phase conjugate processing device which performs passive-phase conjugate processing on the forward scattering wave separated by the subtraction processing device so as to generate a passive-phase conjugated signal of the forward scattering wave;
an environmental information generating part which fetches calibrated signals which are transmitted from the sound source and received/calibrated at the transducer array, and calculates acoustic constant of an actual propagation space where the sound wave beams propagate based on the calibration signals;
a mesh processing part which assumes a position of the target within the propagation space between the sound source and the transducer array, and outputs information of the assumed arbitrary positions;
a waveform generation processing part which finds the sound wave pulse at an arbitrary position in a sound field by having the sound source at the point where the sound waves transmitted from the sound source make incident as the reference, based on the acoustic constant outputted from the environmental information generating part and the positional information outputted from the mesh processing part;
an autocorrelation processing device which performs, based on sound wave pulse information received from the waveform generation processing part, autocorrelation processing on the traveling wave that is the sound wave transmitted from the sound source, which makes incident on an arbitrary position within the propagation space by having the sound source as a reference position so as to generate an autocorrelation processed signal of the traveling wave; and
a correlation device which judges presence or absence of the target from a similarity between the autocorrelation processed signal and the passive-phase conjugated signal.

11. A non-transitory computer readable recording medium storing a target searching program for executing a control for searching presence or absence of a target within a propagation space by using a computer, which controls searching of the target by using, from a backward scattering wave scattering backward from the target and a forward scattering wave scattering forward from the target, the forward scattering wave, and by using the forward scattering wave and a traveling wave from a sound source making incident on the target within the propagation space, the program enabling the computer to execute:
a function which performs subtract processing for subtracting the traveling wave that is a probe signal directly traveling from the sound source towards the transducer array when the target does not exist within the propagation space from a mixed wave of the forward scattering wave that is a data signal and the traveling wave that is the probe signal directly traveling from the sound source towards the transducer array so as to separate a difference obtained by the subtraction processing as the forward scattering wave that is the data signal;
a function which performs passive-phase conjugate processing on the forward scattering wave separated by the subtraction processing device so as to generate a passive-phase conjugated signal of the forward scattering wave;
a function which fetches calibrated signals which are transmitted from the sound source and received/calibrated at the transducer array, and calculates acoustic constant of an actual propagation space where the sound wave beams propagate based on the calibration signals;
a function which assumes a position of the target within the propagation space between the sound source and the transducer array, and outputs information of the assumed arbitrary positions;
a function which finds the sound wave pulse at an arbitrary position in a sound field by having the sound source at the point where the sound waves transmitted from the sound source make incident as the reference, based on the acoustic constants and the positional information;
a function which performs, based on sound wave pulse information received from the waveform generation processing part, autocorrelation processing on the traveling wave that is the sound wave transmitted from the sound source, which makes incident on an arbitrary position within the propagation space by having the sound source as a reference position so as to generate an autocorrelation processed signal of the traveling wave; and
a function which judges a similarity between the autocorrelation processed signal and the passive-phase conjugated signal.

12. A target searching method for searching presence or absence of a target within a propagation space, which searches the target by using, from a backward scattering wave scattering backward from the target and a forward scattering wave scattering forward from the target, the forward scattering wave, and by using the forward scattering wave and a traveling wave from a sound source making incident on the target within the propagation space, the method comprising:
transmitting a sound wave that is a probe signal into the propagation space from the sound source;
performing subtraction processing for subtracting the traveling wave that is a probe signal directly traveling from the sound source towards the transducer array when the target does not exist within the propagation space from a mixed wave of the forward scattering wave that is a data signal and the traveling wave that is the probe signal directly traveling from the sound source towards the transducer array so as to separate a difference obtained by the subtraction processing as the forward scattering wave that is the data signal;
performing passive-phase conjugate processing on the forward scattering wave separated by the subtraction processing device so as to generate a passive-phase conjugated signal of the forward scattering wave;
fetching calibrated signals which are transmitted from the sound source and received/calibrated at the transducer array, and calculating acoustic constant of an actual propagation space where the sound wave beams propagate based on the calibration signals;
assuming a position of the target within the propagation space between the sound source and the transducer array, and outputting information of the assumed arbitrary positions;
finding the sound wave pulse at an arbitrary position in a sound field by having the sound source at the point where the sound waves transmitted from the sound source make incident as the reference, based on the acoustic constants and the positional information;
performing autocorrelation processing, based on sound wave pulse information received from the waveform generation processing part, on the traveling wave that is the sound wave transmitted from the sound source, which makes incident on an arbitrary position within the propagation space by having the sound source as a reference position so as to generate an autocorrelation processed signal of the traveling wave; and judging a similarity between the autocorrelation processed signal and the passive-phase conjugated signal.

13. A target searching means for searching presence or absence of a target within a propagation space, which searches the target by using, from a backward scattering wave scattering backward from the target and a forward scattering wave scattering forward from the target, the forward scattering wave, and by using the forward scattering wave and a traveling wave from a sound source making incident on the target within the propagation space, the means comprising:

sound source means for transmitting a sound wave that is a probe signal into the propagation space;

a transducer array placed in an area to receive the forward scattering wave that is a data signal which scatters forward from the target when present within the propagation space;

subtraction processing means for performing subtracting processing for subtracting the traveling wave that is the probe signal directly traveling from the sound source means towards the transducer array when the target does not exist within the propagation space from a mixed wave of the forward scattering wave and the traveling wave that is the probe signal directly traveling from the sound source means towards the transducer array so as to separate a difference obtained by the subtraction processing as the forward scattering wave that is the data signal;

passive-phase conjugate processing means for performing passive-phase conjugate processing on the forward scattering wave separated by the subtraction processing means so as to generate a passive-phase conjugated signal of the forward scattering wave;

environmental information generating means for fetching calibrated signals which are transmitted from the sound source means and received/calibrated at the transducer array, and calculating acoustic constant of an actual propagating space where the sound wave beams propagate based on the calibration signals;

mesh processing means for assuming a position of the target within the propagation space between the sound source means and the transducer array, and outputting information of the assumed arbitrary positions;

waveform generation processing means for finding the sound wave pulse at an arbitrary position in a sound field by having the sound source means at the point where the sound waves transmitted from the sound source means make incident as the reference, based on the acoustic constants outputted from the environmental information generating means and the positional information outputted from the mesh processing means;

autocorrelation processing means for performing, based on sound wave pulse information received from the waveform generation processing means, autocorrelation processing on the traveling wave that is the sound wave transmitted from the sound source means, which makes incident on an arbitrary position within the propagation space by having the sound source as a reference position so as to generate an autocorrelation processed signal of the traveling wave; and correlation means for judging presence or absence of the target from a similarity between the autocorrelation processed signal and the passive-phase conjugated signal.

* * * * *

UNITED STATES PATENT AND TRADEMARK OFFICE
CERTIFICATE OF CORRECTION

PATENT NO. : 8,649,244 B2
APPLICATION NO. : 12/491678
DATED : February 11, 2014
INVENTOR(S) : Yoshiaki Tsurugaya and Toshiaki Kikuchi It is certified that error appears in the above-identified patent and that said Letters Patent is hereby corrected as shown below:

In the Specification

Column 5, Line 31: Delete

" $$P_{pc}(r, z', t) = \sum_{j=1}^{J} \int G_{\omega}(r, z, z_j) G_{\omega}^*(R; z_j, z_{ps}) \times e^{i\omega T} S^*(\omega)^{-i\omega} d\omega$$ " and insert -- $$P_{pc}(r, z', t) = \sum_{j=1}^{J} \int G_{\omega}(r, z, z_j) G_{\omega}^*(R; z_j, z_{ps}) \times e^{i\omega T} S^*(\omega) e^{-i\omega} d\omega$$ --

Column 13, Line 35: Delete

" $$P(r, z, t) = \frac{1}{2\pi} \int_{\omega_b}^{\omega_b} S(\omega) P(r, z, \omega) e^{-ii\omega t} d\omega$$ " and insert -- $$P(r, z, t) = \frac{1}{2\pi} \int_{\omega_b}^{\omega_b} S(\omega) P(r, z, \omega) e^{-i\omega t} d\omega$$ --

Signed and Sealed this
Second Day of December, 2014

Michelle K. Lee
*Deputy Director of the United States Patent and Trademark Office*